United States Patent
Eriksen et al.

(10) Patent No.: US 7,309,377 B2
(45) Date of Patent: Dec. 18, 2007

(54) METHOD FOR SEPARATION OF ISOTOPES

(75) Inventors: Dag Ølstein Eriksen, Oslo (NO); Bruno Ceccaroli, Kristiansand (NO)

(73) Assignee: Isosilicon AS, Kristiansand (NO)

( * ) Notice: Subject to any disclaimer, the term of this patent is extended or adjusted under 35 U.S.C. 154(b) by 238 days.

(21) Appl. No.: 10/518,762

(22) PCT Filed: Jun. 26, 2003

(86) PCT No.: PCT/NO03/00216

§ 371 (c)(1),
(2), (4) Date: Dec. 21, 2004

(87) PCT Pub. No.: WO2004/004871

PCT Pub. Date: Jan. 15, 2004

(65) Prior Publication Data

US 2005/0247195 A1    Nov. 10, 2005

(30) Foreign Application Priority Data

Jul. 5, 2002    (NO) .................. 20023278

(51) Int. Cl.
*B01D 53/02* (2006.01)
(52) U.S. Cl. ............. 95/82; 95/88; 96/101
(58) Field of Classification Search ........... 95/82, 95/87, 88, 31; 96/101–107; 73/23.35–23.42; 422/89–92; 210/656, 198.2
See application file for complete search history.

(56) References Cited

U.S. PATENT DOCUMENTS 4,010,100 A * 3/1977 Suslick ............ 95/82
4,780,116 A * 10/1988 Cheh et al. ............ 96/102
6,146,601 A * 11/2000 Abesadze et al. ............ 423/89
2003/0039865 A1   2/2003 Alexander et al.

FOREIGN PATENT DOCUMENTS

| JP | 61-107927 | 5/1986 |
| JP | 2001-199792 | 7/2001 |
| JP | 2001199792 A * | 7/2001 |
| RU | 2170609 | 7/2001 |

OTHER PUBLICATIONS

Ullmann's Encyclopedia of Industrial Chemistry, Fifth, Compltely Revised Ed. , vol. A15, 1990, pp. 43-46.
Mills, "Silicon Isotope Separation by Distillation of Silicone Tetraflouride", Separation Science and Technology 25(3) pp. 335-345, 1990.
Korolev, "Separation of Silicone Isotopes by Silicon Tetraflouride-Silicone Technology", Inorganic Materials vol. 38, No. 6, pp. 539-541, 2002.

* cited by examiner

*Primary Examiner*—Duane Smith
*Assistant Examiner*—Robert A Clemente
(74) *Attorney, Agent, or Firm*—Christian D. Abel

(57) ABSTRACT

This invention relates to a method for separation of isotopes, that is, to obtain isotopically pure fractions by separating natural 1 isotope mixtures in elements, where hydrogen is employed as ligand on the elements that are to be isotopically separated, and where the resulting compounds are gaseous at practical temperatures and pressures. More specific, the invention relates to a method for obtaining an isotopically pure $28SiH_4$ in industrial scale by separating the isotopes in a chromatographic column.

6 Claims, 2 Drawing Sheets

*Figure 1 An example of the separation between argon and silane. The gases are injected simultaneously as a short pulse. Particles in this case are Hydro 2. Carrier gas is helium and the ratio between argon and silane is 95:5.*

METHOD FOR SEPARATION OF ISOTOPES

This invention relates to a method for separation of isotopes, that is, to obtain isotopically pure fractions by separating natural occurring isotope mixtures in elements. More specific, the invention relates to a method for production of isotopically pure fractions of isotopes that is suited to be implemented in industrial scale. Even more specific, the invention relates to a method for obtaining an isotopically pure $^{28}$SiH4 in industrial scale.

BACKGROUND

The semiconductor industry had product sales of over $125 billion in 1997 and due to its size is a growth engine for the world economy. Nearly all of these products were manufactured from one single raw material-silicon. The industry has accumulated decades of experience and invested billions of dollars in developing manufacturing processes for silicon-based semiconductors.

Two drivers of the semiconductor industry are performance improvement and cost reduction. This has been achieved by shrinking the size of chips while at the same time putting more transistors on individual chips. Historically there has been doubling of the number of transistors on a chip every 18 month, this is known as Moore's law. Many predictions have been made that this rate of progress will necessarily decrease, but it has not. So far, engineers and scientists have found ways to go around roadblocks and continued the progress.

One unavoidable consequence of device shrinkage and higher operating speeds is an increased power density. However, in order to maintain the high operation speeds, or more precisely the high operation frequency, the operation temperatures of the chip must be kept at reasonable levels. Especially since an increased operation temperature also gives increased levels of noise and accordingly levels of erroneous operation. It has long been known that this problem can be solved by employing materials with a higher thermal conductivity and/or other beneficial properties than possessed by silicon. But since the semiconductor industry has invested such vast amount of experience and money into the existing production lines based on silicon-chips, any material innovations in the semiconductor industry should be built on, not replace, this vast silicon experience and manufacturing base. An example of this can be seen from the fact that gallium arsenide, a material with higher performances than silicon, has not been able to replace the silicon due to the necessity of investing billions of dollars to the change the manufacturing infrastructure world-wide.

Thus, in order to further increase the capacity, i.e. increase the density and the operating frequency of the next generation of integrated circuits, the heat produced in the silicon must be fast and efficiently extracted. Up till now this problem has been solved by "thinning", i.e. the processors are made thinner and/or to equip them with heat sinks and on-board fans etc. in order to increase the heat removal rates. In practise, this solution can only be employed as long as the power consumption of the processor is less than 110-120 W, and this power level was expected to be reached around 2001. As far as we know, the only practically implemented solution to further increase the heat removal rate is introduction of closed-loop cooling systems in the processors. But they tend to cost more than the processor itself and are thus not a satisfactory solution.

It does therefore seem that the solution to the problem with excess heat should be found by changing the focus from how to lead the generated heat away, to how to avoid the heat from being generated.

The reason for heat generation is the electrical resistance within the silicon material of the processors. It has been known since early 1940 that the thermal conductivity of some elements was depended upon the isotope composition of the element. For instance, it became established in 1958 that the thermal conductivity of diamond was reduced by 30% by introduction of 1.1% of the $^{13}$C-isotope. Capinski et al. [1] and [2] has recently shown that isotopically pure $^{28}$Si has at least 60% better thermal conductivity at room temperature and over 250% better at −170° C., than silicon with a natural isotope composition. The reason for the enhanced thermal resistance in isotopically mixed metals is believed to be due to differences in the vibrational states of the different isotopes. Thus, if mono-isotopic silicon could be used, the vibration (phonon-) spectra throughout the crystalline structure would be greatly simplified and hence the thermal conductivity will be significantly improved [1 and 2]. A major microprocessor manufacturer has modelled isotopically pure $^{28}$Si-wafers based on the findings of Capinski et al., and calculated that the peak temperature of a 1 GHz microprocessor would be reduced by 35° C. Such a substantial reduction in the heat generation rate would remove a major industrial roadblock and allow the cheap and already implemented solution of equipping silicon chips with heat sinks and on-board fans to be used for years to come.

Another great advantage with employing isotopically pure silicon is that isotopically pure silicon is silicon. It is chemically almost identically the same as "natural silicon" and can readily be used in existing manufacturing processes without requiring changes in the production line of electronic devices. Another fortunate fact is that naturally occurring silicon contains three stable non-radioactive isotopes where $^{28}$Si is the far most abundant (~92%), while the two others $^{29}$Si and $^{30}$Si are present in approximately 5 and 3%, respectively. Thus a large portion of the isotope separation is already performed by Mother Nature, such that the removal of the relatively small fractions of the two other isotopes should be relatively easy compared to other materials with a more equalised isotope composition.

Thus in conclusion, isotopically pure $^{28}$Si represents a very promising and easily implemented solution to the excess heat problem of high performance silicon chips.

PRIOR ART

Since isotopes are almost chemically the same, isotope separation should necessarily include mass-separation techniques. There are several possible physical processes where mass-separation is observed. Some take place naturally, but to obtain large enhancements in mass ratios sophisticated processes have been developed. The main processes utilised are based on one or more of the following concepts: Mass diffusion, membrane, distillation, electrolysis, electromagnetic, centrifugation, separation nozzle, selective excitation by laser, ion-mobility, chemical exchange, and chromatography.

The factors which dictate the choice of process to be employed are dependent on the size of the production. In laboratories and small scale plants where flexibility and low capital cost are important, the thermal diffusion column is the preferred method. For light elements, distillation and chemical exchange are most economical for large scale separation, whereas for heavy elements gaseous diffusion and gas centrifuges are the most economical methods.

Generally speaking, there are only two isotope separation methods in industrial scale which are commercially in use today:

Gas centrifuges, where the mass fractions are separated by centrifugal forces, and diffusion of gases through membranes, where the lighter isotopes diffuses faster through the membrane thus creating a fractionation.

Traditionally, large scale production of isotopically pure fractions of elements has been employed in the following areas:

Heavy water is used in nuclear power, i.e. Candu reactors, in neutron moderators, and as a reagent in the synthesis of deuterated compounds. During the last 50 years the development of fusion energy (both the hydrogen bomb and peaceful fusion) has boosted a search for $^2$H and $^3$H (D and T). This is because these nuclides are key components in the fusion reaction: $^2$H+$^3$H→$^4$He+n.

Fusion is also one of the reasons for interest in lithium. Using LiD instead of $D_2$ transform a gas to a solid material. Moreover, $^6$Li+$^1$n→$^4$He+$^3$H, thus producing tritium for further fusion. The most abundant Li-isotope, $^7$Li (92.6%) has a very low absorption cross section for neutrons and is therefore used as a neutron reflector. Thus, both stable lithium isotopes have commercial value.

Neutron detectors need absorbing materials with high affinity for neutrons and an easy detection of the resulting prompt radiation. Two gas detectors are dominating the marked: $^3$He and $^{10}$BF$_3$. The respective reactions are: $^3$He+$^1$n→$^3$H+$^1$H, in which both product nuclei ionise the gas creating a recorded electrical discharge; $^{10}$B+$^1$n→$^4$He+$^7$Li, where $^4$He is the ionising species. Thus, there is a marked for isotopically pure $^3$He and $^{10}$B. Neutrons are used as hydrogen sensors in industry. Thus, neutron sources and detectors are used to measure humidity in wood and paper, petroleum containing rock layers in oil wells, etc.

Uranium is the most studied element when separation of isotopes is concerned. This is, of course, due to its use as nuclear fuel and in nuclear bombs. The fissile isotope is $^{235}$U (natural abundance 0.720%) while $^{238}$U is the most abundant isotope (99.275%). The isotopic separation is usually based on diffusion of UF$_6$, a gas at temperatures above 56° C.

In nuclear waste recovery the selective separation of $^1$H$^3$HO from $^1$H$_2$O is important since it reduces the amounts of radioactive water to dispose of. Also, the separation of transuranes, i.e. in particular plutonium, is an important topic in nuclear waste recovery. In mixed oxide fuel (MOX) both $^{235}$U and $^{239}$Pu are used as fission sources. Thus it is important to separate $^{238}$Pu from $^{239}$Pu since $^{238}$Pu acts a neutron absorber.

In addition there has been extensive use of other isotopically pure elements, such as $^{13}$C, within research science and medicine.

Isonics Corpration and Eagle-Pitcher of Quapaw, Okla. has announced the construction of a pilot plant for production of isotopically pure $^{28}$SiF$_4$. This product must then be chemically converted to SiH$_4$ if to be used in the semiconductor industry.

Common for all these fields of employing isotopically pure isotopes is that the mass separated isotopes are very expensive. This may be due to that they are all fields where the demand is present nearly regardless the price of the pure isotopes. Thus there has not been an adequately strong driving force for obtaining cheaper production methods for mass-separating isotopes in large scales. Also, the mass difference of the isotopes are comparatively low, such that a very high number of successive separation stages are required and thus boosting the costs and energy consumption.

However, in the case of substituting natural isotopic silicon with isotopically pure $^{28}$Si for the semiconductor industry, there is a ceiling for the additional cost of a silicon wafer of isotopically pure $^{28}$Si. The additional cost must be markedly lower than the additional costs induced by equipping conventional silicon wafers with closed-loop cooling systems in order to be able to compete with this already implemented solution. Also, these costs have been proven to large for the relatively price sensitive semiconductor marked. Thus there is a general need for cheaper production methods for mass-separating isotopes, especially for mass-separating $^{28}$Si from natural occurring Si.

It is known that the best and perhaps only property that may be employed to separate isotopes is the mass diffusion constant, since isotopes have almost identical chemical properties. And in order to obtain sufficiently efficient mass-separation techniques, one should use compounds in the gaseous phase because diffusivities are much larger in gases than in liquids. This may be why isotope separation techniques involving metals traditionally has been focused on the use of fluorine as the ligand since many metals only form gaseous compounds with this ligand.

OBJECTIVE OF THE INVENTION

The main objective of the invention is to provide a method for large scale mass-separation of isotopes which overcomes the above mentioned problems.

It is another objective of this invention to provide a method for large scale mass-separation of $^{28}$Si from naturally occurring Si that is markedly more effective and cheaper in use than existing methods.

DESCRIPTION OF THE INVENTION

The objectives of the present invention can be obtained by a method as described in the appended claims and in the description given below.

The inventive method is based on the utilisation of the recognition that the mass diffusion constant is approximately inverse proportional to the square of the mass of the molecule/atom, such that the lighter the compounds to be separated are, the larger the differences in the diffusion coefficient of the different isotopes will be. Thus, one should employ the lightest possible substantially monoisotopic ligands that form gaseous compounds at practical temperatures and pressures with the element that is to be isotopically refined. The term "practical temperatures" is related to any temperature at which the process equipment can be operated.

The lightest possible ligand is hydrogen. This element is not only very light compared to the conventionally employed halogens (mostly fluorine), forms gaseous compounds with elements that are of interest for the electronic and semiconductor industries, but is also naturally present as gen itself is an interesting element for isotope separation, especially when the use in nuclear applications is considered. A list of the compounds, the isotopes and corresponding abundances in question are presented in Table 1. In Table 2 the physical properties of the compounds are listed. By practical pressures and temperatures, we mean pressures within approximately 0.25-100 bar and temperatures within approximately −195 to +400° C., preferably 0.5-10 bar and −195-+100° C.

TABLE 1

Gaseous hydrids, the isotopes and abundances.

| Compound | At. no. | \multicolumn{14}{c}{Isotopes (mass number, A) and abundances (I in %)} |
|---|---|---|---|---|---|---|---|---|---|---|---|---|---|---|---|---|
| | | A | I | A | I | A | I | A | I | A | I | A | I | A | I | A | I |
| $H_2$ | 1 | 1 | 99.985 | 2 | 0.015 | | | | | | | | | | | | |
| $B_2H_6$ | 5 | 10 | 20.0 | 11 | 80.0 | | | | | | | | | | | | |
| $CH_4$ | 6 | 12 | 98.90 | 13 | 1.10 | | | | | | | | | | | | |
| $NH_3$ | 7 | 14 | 99.63 | 15 | 0.37 | | | | | | | | | | | | |
| $H_2O$ | 8 | 16 | 99.762 | 17 | 0.038 | 18 | 0.200 | | | | | | | | | | |
| $SiH_4$ | 14 | 28 | 92.23 | 29 | 4.67 | 30 | 3.10 | | | | | | | | | | |
| $H_2S$ | 16 | 32 | 95.02 | 33 | 0.75 | 34 | 4.21 | 36 | 0.02 | | | | | | | | |
| HCl | 17 | 35 | 75.77 | 37 | 24.23 | | | | | | | | | | | | |
| $Ga_2H_6$ | 31 | 69 | 60.1 | 71 | 39.9 | | | | | | | | | | | | |
| $Ge_2H_6$ | 32 | 70 | 20.5 | 72 | 27.4 | 73 | 7.8 | 74 | 35.5 | 76 | 7.8 | | | | | | |
| $H_2Se$ | 34 | 74 | 0.9 | 76 | 9 | 77 | 7.6 | 78 | 23.5 | 80 | 49.6 | 82 | 9.4 | | | | |
| HBr | 35 | 79 | 50.69 | 81 | 49.31 | | | | | | | | | | | | |
| $H_2Sb$ | 51 | 121 | 57.3 | 123 | 42.7 | | | | | | | | | | | | |
| $H_2Te$ | 52 | 120 | 0.096 | 122 | 2.6 | 123 | 0.908 | 124 | 4.816 | 125 | 7.14 | 126 | 19 | 128 | 31.69 | 130 | 33.8 | almost a monoisotopic $^1H$ with only less than 0.015% $^2H$ (also commonly denoted as "D"). This low abundance of D does not pose a serious problem, such that the above mentioned properties are all beneficial and make hydrogen the ideal ligand in order to obtain the objectives of this invention.

The effect of the reduced weight can be demonstrated by comparing the practical mass difference between $^{28}SiF_4$ and $^{29}SiF_4$ in the above mentioned conventional process of Isonics Corporation, which is (29−28)/(29+76)= 0.00961 with the corresponding practical mass difference between $^{28}SiH_4$ and $^{29}SiH_4$ which is (29 −28)/(29+4)= 0.030303. The substitution of fluorine with hydrogen in the case of refining silicon isotopes gives an increase in the practical mass difference of more than 300%, such that the efficiency of a mass separation process employing SiH4 will thus be approximately tripled in comparison with the conventional processes based on $SiF_4$. Another beneficial feature in the case of supplying the semiconductor and electronic industry is that $SiH_4$ is an often used raw material for forming both the semi conducting and insulating layers of semiconductors. Thus the isotopically refined compound can be used directly in the production lines of the semiconductor industries without requiring any chemical conversion of the feed stock.

The elements that form gaseous hydrogen compounds at practical pressures and temperatures are; B, N, C, O, F, Si, P, S, Cl, Ga, Ge, As, Se, Br, Sb, Te and I. Of these, F, P, As, and I are mono-isotopic and are therefore not a subject for isotope separations. The gaseous compounds of interest are correspondingly: $B_2H_6$, $NH_3$, $CH_4$, $H_2O$, $SiH_4$, $H_2S$, HCl, $Ga_2H_6$, $Ge_2H_6$, $H_2Se$, HBr, $H_2Sb$, and $H_2Te$. In fact, hydro- The inventive idea of employing hydrogen as the ligand can be implemented in all known conventional isotope separation processes, including, but not limited to, the presently most commonly used techniques for industrial scale isotope separation based on gas centrifugation and diffusion through membranes. Many chemical and physical properties of hydrides are of course different from the corresponding conventionally used fluorides, such that there might be necessary to alter process parameters such as temperature, gas pressure, chemical affinity of the membrane material, etc.

In the case of employing an inert carrier gas, it is observed that the mass ratio of the molecular masses of the compound that are to be isotopically separated and the carrier gas is especially important. That is, the mass ratio should be as high as possible (the carrier gas should have the highest molecular mass) in order to obtain the highest separation degree in each process step. This is believed to be due to the fact that in elastic collisions, it is the lightest participants that receive the most vigorous movement. And since an optimised mass diffusion based separation effect is sought, one should aim at enhancing the diffusive movement of the molecules that are to be isotopically separated as much as possible. This implies the use of heavy inert carrier gases.

In addition to the conventionally used industrial scale techniques such as gas cyclones and membrane diffusion, it is envisioned that diffusional chromatography will be very suited for implementing the inventive idea in industrial scale. This process has up till date been regarded as to expensive for large scale use and has

TABLE 2

Some physical properties of gaseous hydrids.

| Compound | Atomic no. | Mol.mass (g/mole) | Melt. Pnt. (° C.) | Boil. Pnt. (° C.) | Dipole mom. $(10^{-30}\ Cm)$ |
|---|---|---|---|---|---|
| $H_2$ | 1 | 2.0158 | −259.14 | 252.8 | 0.0 |
| $B_2H_6$ | 5 | 27.67 | −165.5 | −92.5 | 0.0 |
| $CH_4$ | 6 | 16.04 | −182 | −164 | 0.0 |
| $NH_3$ | 7 | 17.03 | −77.7 | −33.35 | |
| $H_2O$ | 8 | 18.0153 | 0 | 100 | |
| $SiH_4$ | 14 | 32.12 | −185 | −111.8 | 0.0 |
| $H_2S$ | 16 | 34.08 | −85.5 | −60.7 | |
| HCl | 17 | 36.46 | −114.8 | −84.9 | 3.60 |
| $Ga_2H_6$ | 31 | 145.49 | −21.4 | 139 | 0.0 |
| $Ge_2H_6$ | 32 | 151.23 | −109 | 29 | 0.0 |
| $H_2Se$ | 34 | 80.98 | −60.4 | −41.5 | |
| HBr | 35 | 80.92 | −88.5 | −67.0 | |
| $H_2Sb$ | 51 | 124.77 | −88.5 | −17.0 | |
| $H_2Te$ | 52 | 129.62 | −48.9 | −2.2 | | been solely used for small scale separation. However, given the right combination of carrier gas, column packing material, driving pressures, and temperatures, the column based diffusion should greatly increase the number of separation stages per unit energy and thus be a cheap alternative.

DETAILED DESCRIPTION OF THE INVENTION

Figure 1:
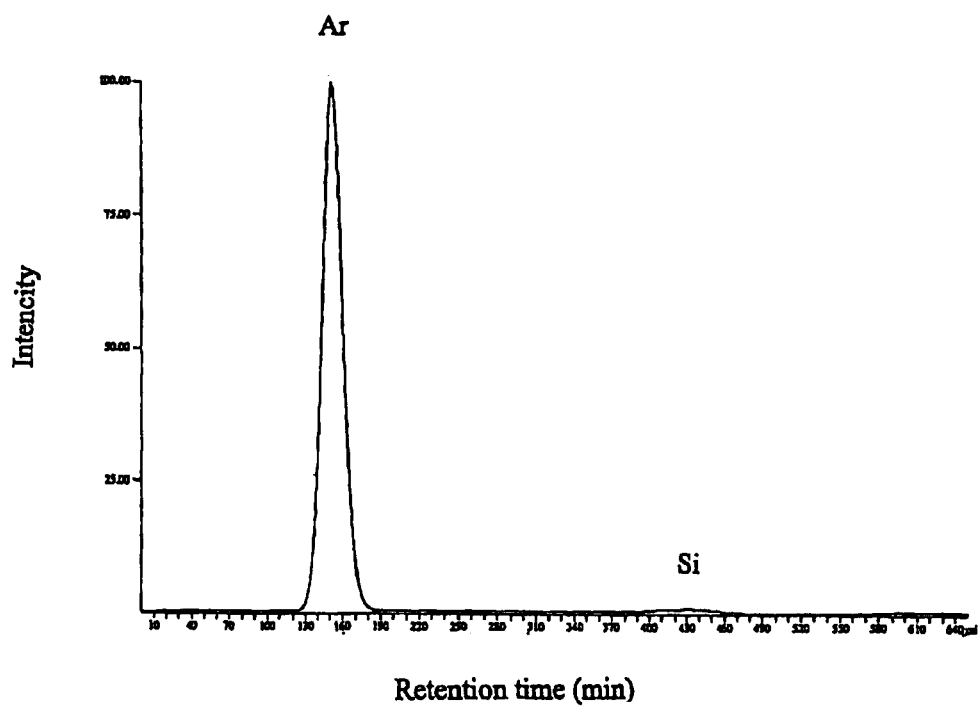
FIG. 1 shows an example of the separation between argon and silane. The gases are injected simultaneously as a short pulse. Particles in this case are Hydro 2. Carrier gas is helium and the ratio between argon and silane is 95:5.

The invention will now be described in greater detail under reference to an example of a preferred embodiment of the invention in the case of employing a chromato-graphic column for isotopically separating $^{28}SiH_4$ from $^{29}SiH_4$ and $^{30}SiH4$. It should however be accomplished that the inventive method can be implemented for separation of isotopes of any of the other compounds given in Table 1 or 2.

Separation of chemical species by sending them through a chromatographic column is a technique that is widely used and well known for a skilled person. Thus it does not need to be described any further.

However, in order to verify the invention in the case of employing chromatography technique for isotope separation in large scale, a test series of isotope mass separation in a chromatographic column were performed with the following experimental specifications:

Test Procedure

As a safety precaution, it is preferred to dilute the explosive and self-igniting silane gas with argon before entering the chromatographic column. The silane concentration should be in the range 5-10%, thus a 10 L bottle with 5% silane in argon was purchased from AGA and used as a stock mixture, Aliquots were brought to the GC-MS in a 50mL steel flask from which the injection loop was filled. There was employed the monodisperse particles given in Table 3. The particles produced by Dyno Particles, the producer of Dynospheres had a price that is considered prohibitive for industrial process, such that the focus was put on the particles produced and supplied by Hydro Particles. Further, the columns were made of stainless steel tubes 1/16 or 1/8 inch inner diameter. All columns were approximately 10 m long except one that was 30m for testing effect of column length.

The test work was aimed at covering the impact of the following parameters:

Packing material: porosity, composition, packing density

Temperature

Pressure, i.e. the flow rate of carrier gas

Carrier gas

Column preparation

The particles were pressed into the tube by using liquid $CO_2$ delivered from a $CO_2$-supercritical extraction pump, ISCO Model 260D Syringe pump with ISCO SFX 200 controller, at a pressure of 300 bar and a fluid flow of 0.1-0.2 mL/min. During packing the tubing was submersed in an ultrasound bath. After the packing the pressure was released slowly to avoid release of particles.

To avoid leakage of particles a VALCO filter was mounted in each end. (The second one was mounted after packing).

After mounting the column in the GC-MS, it was poured with argon to get rid of trapped $CO_2$ and air. The level of $CO_2$, $O_2$, and $N_2$ was monitored by the mass spectrometer.

TABLE 3

Properties of packing materials tested. All particles are monodispersed.
DVB = divinylbenzene, PS = polystyrene, PA = polyacrylate.
NK = Not known.

| Particle manufacturer | Type denotation | Polymer | Particle size (μm) | Porosity (%) | Area $(m^2/g)$ |
|---|---|---|---|---|---|
| Dynospheres | EXP-PD | DVB-PS | 21.1 | 65 | NK |
| Dynospheres | EXP-SS | DVB-PS | 10.1 | | NK |
| Hydro Particles | Hydro 1 | DVB-PS | 20 | | |
| Hydro Particles | Hydro 2 | DVB-PA | 20 | 70 | 233 |
| Hydro Particles | Hydro 3 | DVB-PA | 20 | 70 | 148 |
| Hydro Particles | Hydro 4 | DVB-PA | 20 | 52.5 | 236 |

Analysis Procedure

To measure any isotope separation it was imperative to connect the column output to a mass spectrometer for a direct and continuous measurement. The gas-chromatograph and mass-spectrometer was a Hewlett-Packard 5890 Series II GC and 5971A Mass selective detector. It was controlled by HP ChemStation data aquisition system, and used as a continuous logger of the output of the columns.

The ion source in this type of mass-spectrometer ionises silane in a way that creates a distribution of masses: $SiH_3^+$, $SiH_2^{2+}$, $SiH^{3+}$, and $Si^{4+}$, i.e. masses 28-33. Background contribution from $O_2$, i.e. mass 32, and $N_2$, i.e. mass 28, thus represent a problem. However, it can be shown that the contribution from $^{29}Si$ is 4.8% of response at mass 29 and that mass 33 must solely represent $^{30}SiH_3^+$. Therefore, to avoid problems from background contributions of $N_2$ (mass 28) and $O_2$ (mass 32), the analysis is focused on masses 29 and 33 and their proportions.

The data analysis has been performed as follows:

1. The program EasyQuan made by APT is used for determination of retention time and the peak width.

Also, this program is used for compressing the spectrum and exporting the processed data into format acceptable for Microsoft Excel.

2. The data are imported into Excel flow sheet, the background is subtracted, and the mass ratio spectra are calculated.

Mass-Separation Tests

Conceptually, there are two ways the mass separation of the isotopes can be revealed; by differences in the velocity due to different isotopic masses, and difference in diffusion coefficients, but not in the convective flow pattern. If the former effect apply different positions of the mass peaks are expected, while in the

TABLE 4

Summary of the measured retention times and the peak widths. NA means Not Applicable. In cases where pulses are unsymmetrical the retention time is calculated as the top of the response curve.

| Particles | Notation | Test parameters | | | Retention time | | FWTH | |
|---|---|---|---|---|---|---|---|---|
| | | Temp. (° C.) | Flow (mL/min) | Carrier gas | Ar (min) | $SiH_4$ (min) | Ar (min) | $SiH_4$ (min) |
| Dynospheres | EXP-PD | 30 | 0.3 | He | 51.2 | 12.0 | 165.5 | 16.7 |
| | | 30 | 0.3 | Ar | NA | 175.8 | NA | 13.9 |
| | | 0 | — | Ar | NA | 303.8 | NA | 29.0 |
| | | −10 | — | Ar | NA | 377.7 | NA | 37.3 |
| Hydro Particles | 1 | 30 | 0.60 | He | Overflow | 76.5 | NA | 11.2 |
| | 1–30 m | 30 | 0.35 | He | 494 | 1400 | 65.7 | 175.2 |
| Hydro Particles | 2 | 30 | 0.25 | He | 148.7 | 429 | 35.2 | 280.3 |
| Hydro Particles | 3 | 50 | 0.35 | He | 80 | 138.3 | 23.0 | 58.3 |
| | | 30 | 0.35 | He | 75 | 175.8 | — | 27.1 |
| | | 30 | 0.35 | He | 75 | 177.4 | — | 26.5 |
| | | 30 | 0.85 | He | 60 | 140.0 | — | 18.0 |
| Hydro Particles | 4 | 30 | 0.4 | He | 173.1 | 764.8 | 41.7 | 137.0 |

3. The net spectra are imported into the plotting package Origin by Microcal Software. The peak region of interest is plotted and the pulses are fitted to a Gaussian shape.

4. If the mass ratio between masses 33 and 29 shows non-constant time dependence, an asymmetric fit is performed.

Results

The results show that the use of chromatographic columns to separate isotopes can be well suited for implementation in industrial scale. The results are divided in two parts. First it is shown that the carrier gas and the silicon compound that is to be isotopically separated are well separated chemically in the column such that there should be no problems with contamination of the product by the carrier gas. Then it is shown that the inventive method for isotopically separation of isotopes give satisfactory results that allows implementation of the chromatography technique in industrial scale.

Chemical Separation

In FIG. 1 a plot of silane- and argon responses are shown as functions of retention time. The plot shows that silane is retained relative to argon, such that it is possible to separate silane from argon simply by moving such a gas mixture through a column with the proper porous material. All the particles from Hydro Particles show this effect. This retention of silane is surprising since argon is heavier than silane and is therefore expected to move slower through the column. Thus the retention cannot be of kinetic nature and must therefore be due to molecular interactions between the porous material and silane.

Table 4 summarises the results of the retention measurements of argon and silane obtained with the different particles. Also reported are the widths of the pulses defined as the (full) width at $1/10^{th}$ of the peak height (FWTH). This was determined by using an option in EasyQuan specially made for this purpose.

latter case the effect will show up as differences in the widths of the mass-responses.

All columns have been tested with several silane pulses to ensure stable operation. Most of them have also been tested at more temperatures than one. The temperature selected as reference was 30° C., i.e. slightly above the ambient temperature.

Figure 2:
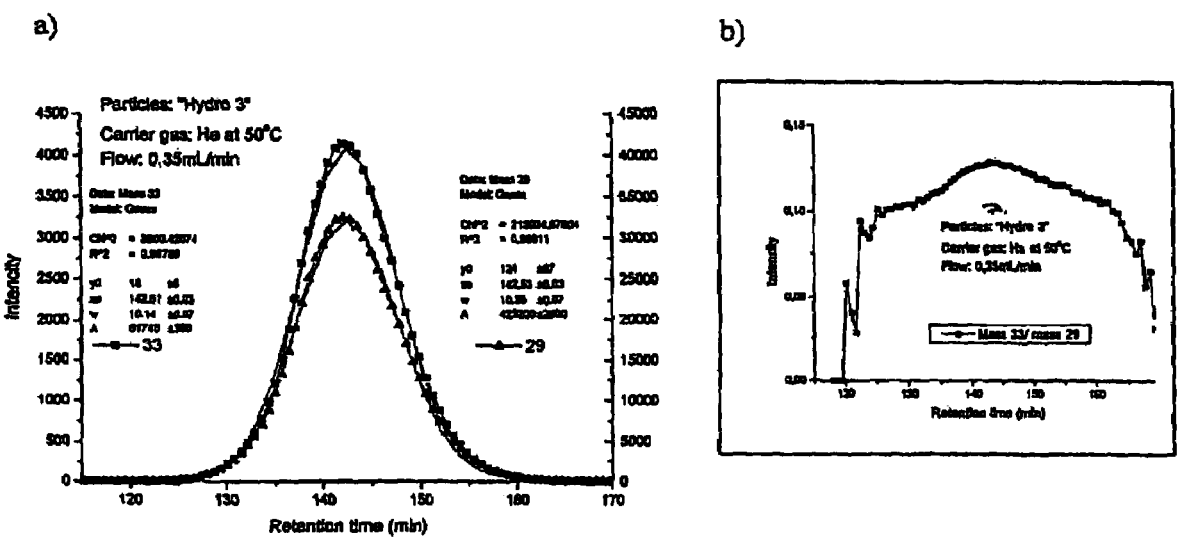
FIG. 2 Part a) is a graph showing a test of 10 m column containing particles "Hydro 3" testing the effect of a faster convective flow, carrier gas is He, temperature is 30° C., and flow is 0.85mL/min. Part b) shows the results as a plot of the mass ratio a function of the data recording time.

An example of responses of masses 29 and 33 as well as their mass ratio distributions is given in FIG. 2. In the figure, the abscissa is the retention time relative to when the recording of data started. The true retention time is shown in Table 4. A Gaussian fit is also shown in the figure. As shown in Table 4 most tests are performed at 30° C. and at a flow of 0.35mL/min. In some cases other temperatures are shown as well as other flows.

From FIG. 2 part b), it can be seen that the mass ratio mass 33/mass 29 has a peak, or increases from about 0.100 at the ends of a single silane pulse to 0.125 at the middle of the pulse. This corresponds to a mass separation factor between isotopes $^{28}SiH_4$ and $^{30}SiH_4$ of 1.09.

Similar test results for the Hydro 3 particles at two different temperatures are summarised and given in Table 5. The other types particles presented in Table 4 have also been tested, but gave a lower separation degree and are not presented here.

The separation factors in Table 5 are calculated as the integral from lower limit to upper limit of the mass response curve normalized to the total response. Accordingly, the smaller the integration range, the smaller yield. To calculate the number of stages needed for enrichment of $^{28}Si$ from 92.23% we use a geometrical series:

$$\frac{I_{28}^0}{I_{30}^0}(\alpha_{30}^{28})^n = \frac{I_{28}^n}{I_{30}^n} \Rightarrow n = \ln\left(\frac{I_{28}^n}{I_{30}^n}\frac{I_{30}^0}{I_{28}^0}\right) / \ln \alpha_{30}^{28}$$

where superscript 0 represents the normal isotopic ratio and superscript n after n stages.

Assuming a separation factor of 1.10, to obtain a purity of 99.9% of $^{28}$Si we would then need some 38 stages. This is a considerable lower number of stages than encountered in conventional processes for isotope separation based on heavy ligands such as fluorine, where it may be several thousands stages necessary to obtain sufficiently pure isotope fractions. Thus it is also showed that the present invention may very well be implemented for use in industrial scale separation of isotopes.

The results from Table 5 verify that chromatographic columns may very well be employed for separation of isotopes in large scale. Also, the tests have shown that the following general factors should be utilised in order to optimise the inventive process:
- it should be employed a packing of monodisperse particles. This is believed to be due to that monodisperse particles reduce the dispersion of flow and thus enhancing the effect of diffusion,
- the column should be as long as possible, from about 10 m and above. A column of length 30 m is shown to perform better than a column of length 10 m,
- the temperature should probably be as high as possible, the tests at 50° C. showed better separation degrees than the tests performed at 30° C., and
- the particles should be porous and at the same time have a low surface area.

Finally, the throughput of a column is depending on the cross section area. To boost the yield the cross section of the different columns can be smaller the higher stage number the column has. Assuming 10% yield the optimum ratio between two successive columns' cross sections is $\sqrt{10}=3.16$ Isotope separation by chromatographic columns will necessary include a number of repeatedly succeeding cycles to obtain a high separation degree, where each cycle includes sending the silane and argon gas through the chromatographic column. This can be obtained by collecting the exit gas from one column and insert it into the next column (series-connection), or by equipping one column with recycling ability such that the silane gas can be sent through the same column a number of cycles.

natural isotope composition, in one cycle, travel in a mass stream through a media by diffusion and optionally also convection, and thus obtain a fractioning of the isotopes such that the wanted isotope is enriched in one fraction of the mass stream, collecting this enriched fraction of the mass stream and send it through another cycle to obtain a fraction with higher content of the wanted isotope, and repeat these cycles until the wanted isotope has become sufficiently enriched, wherein
hydrogen is used as ligand on an element that is to be separated, and that hydrogen and the element that is to be separated are employed in the form of a chemical compound that is in a gaseous state at the actual pressure and temperatures,
the chemical compound in a gaseous state is separated by mass diffusion through a chromatographic column, and wherein
the gaseous chemical compound is silane, $SiH_4$ in the case of isotopically separating $^{28}$Si from $^{29}$Si and $^{30}$Si, or
the gaseous chemical compound is one of $B_2H_6$, $NH_3$, $CH_4$, $H_2O$, $H_2S$, $HCl$, $Ga_2H_6$, $H_2Se$, $HBr$, $H_2Sb$, and $H_2Te$ for obtaining an isotopically pure fraction of B, C, O, S, Cl, Ga, Ge, Se, Br, Sb, and Te, respectively.

2. Method according to claim 1, characterised in that the chromatographic column is packed with monodisperse polystyrene particles.

3. Method according to claim 2, characterised in that the monodisperse polystyrene particles are made of a mixture comprising divinylbenzene and polyacrylate.

4. Method according to claim 3, characterised in that the monodisperse polystyrene particles have a particle size of 20 μm, porosity of 70%, and surface area of 148 m$^2$/g.

5. Method according to either claim 1, 2, 3 or 4, characterised in that the carrier gas is argon.

TABLE 5

Results of fit to model. D is diffusion constants and v the linear velocities. Both D and v are calculated from fitting parameters. Selectivity coefficients (separation factor) of $^{28}$Si vs $^{30}$Si, are calculated in the second column from right for 30 and 50° C. In the calculations are used the values from Hydro3.

| Pres. (bar) | Temp. (° C.) | Mass | D (m$^2$/s) | v (m/s) | Integration range (min) Low lim | Up lim | Sep. fact. α | Yield $^{28}$Si |
|---|---|---|---|---|---|---|---|---|
| 0.5 | 30 | 33 | 5.132E−06 | 0.000937 | 165 | 177 | 1.011 | 0.352 |
|  |  | 32 | 5.423E−06 | 0.000935 | 165 | 176 | 1.034 | 0.199 |
|  |  | 31 | 5.221E−06 | 0.000937 | 165 | 175 | 1.068 | 0.094 |
|  |  | 30 | 5.311E−06 | 0.000937 | 165 | 174 | 1.115 | 0.037 |
|  |  | 29 | 5.483E−06 | 0.000937 | 165 | 173 | 1.177 | 0.012 |
| 0.5 | 50 | 33 | 8.148E−06 | 0.001201 | 135 | 142 | 1.014 | 0.374 |
|  |  | 32 | 8.597E−06 | 0.001199 | 135 | 141 | 1.052 | 0.196 |
|  |  | 31 | 8.345E−06 | 0.001201 | 135 | 140 | 1.113 | 0.082 |
|  |  | 30 | 8.542E−06 | 0.001201 | 135 | 139 | 1.211 | 0.027 |
|  |  | 29 | 8.838E−06 | 0.001202 | 135 | 138 | 1.335 | 0.007 |

The invention claimed is:

1. Method for separation of isotopes, where a specific isotope of a isotope composition is purified by exploiting the difference in the isotope's mass diffusivity by making the 6. Method according to claim 5, characterised in that the argon gas has a pressure of 0.5 bar in the chromatographic column and that the temperature is 50° C.

* * * * *